(12) United States Patent
Ghosh et al.

(10) Patent No.: US 7,807,765 B2
(45) Date of Patent: Oct. 5, 2010

(54) HETEROCYCLIC LATEX COPOLYMER AND METHODS OF MAKING AND USING SAME

(75) Inventors: Tirthankar Ghosh, Oreland, PA (US); Morris C. Wills, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 343 days.

(21) Appl. No.: 11/803,460

(22) Filed: May 15, 2007

(65) Prior Publication Data

US 2007/0282063 A1 Dec. 6, 2007

Related U.S. Application Data

(60) Provisional application No. 60/803,522, filed on May 31, 2006, provisional application No. 60/826,591, filed on Sep. 22, 2006.

(51) Int. Cl.
*C08G 73/02* (2006.01)

(52) U.S. Cl. .................. 526/258; 526/260; 526/264; 526/265; 524/548

(58) Field of Classification Search ............. 526/258, 526/260, 264, 265; 524/548
See application file for complete search history.

(56) References Cited

U.S. PATENT DOCUMENTS

| | | | |
|---|---|---|---|
| 4,355,131 A * | 10/1982 | Wise | ............ 524/504 |
| 5,064,923 A | 11/1991 | Kashihara et al. | |
| 5,120,795 A | 6/1992 | Filges et al. | |
| 5,424,122 A * | 6/1995 | Crandall et al. | ........ 428/355 CN |
| 5,608,024 A * | 3/1997 | Shih | .............. 526/264 |
| 5,645,968 A * | 7/1997 | Sacripante et al. | ...... 430/137.14 |
| 5,693,732 A * | 12/1997 | Sharma et al. | .............. 526/263 |
| 5,804,662 A | 9/1998 | Schade et al. | |
| 5,948,546 A * | 9/1999 | Bafford et al. | .............. 428/500 |
| 6,329,483 B1 | 12/2001 | Schade et al. | |
| 6,403,703 B1 | 6/2002 | Slone | |
| 6,469,097 B1 * | 10/2002 | Bett et al. | ................... 524/808 |
| 6,713,552 B1 | 3/2004 | Lesko et al. | |
| 6,825,209 B2 | 11/2004 | Thomas et al. | |
| 2002/0127376 A1 * | 9/2002 | Hutter et al. | ................ 428/195 |
| 2004/0047821 A1 | 3/2004 | Maubru et al. | |
| 2004/0209995 A1 | 10/2004 | Adam et al. | |

FOREIGN PATENT DOCUMENTS

| | | |
|---|---|---|
| EP | 1 396 508 A1 | 3/2004 |
| FR | 2 777 893 A1 | 10/1999 |
| WO | WO 2004/045755 A2 | 6/2004 |

* cited by examiner

*Primary Examiner*—Kelechi C Egwim
(74) *Attorney, Agent, or Firm*—Thomas S. Deibert

(57) ABSTRACT

A latex copolymer composition comprising >5 wt % of polymerized units derived from a monomer X containing an unsaturated heterocycle, wherein the latex copolymer composition comprises ≦1,000 ppm of residual monomer X is disclosed. Also disclosed are methods of making and using the latex copolymer compositions.

7 Claims, No Drawings

US 7,807,765 B2

HETEROCYCLIC LATEX COPOLYMER AND METHODS OF MAKING AND USING SAME

This is a non-provisional application of prior pending U.S. provisional Application Ser. No. 60/803,522 filed on May 31, 2006 and U.S. provisional Application Ser. No. 60/826,591 filed on Sep. 22, 2006.

The present invention relates to a latex copolymer composition, more particularly, a latex copolymer composition comprising >5 wt % of polymerized units derived from monomer X and ≦1,000 ppm of residual monomer X, wherein monomer X contains an unsaturated heterocycle. The present invention also relates to methods of making and methods of using the latex copolymer composition.

One method for preparing aqueous polymer dispersions based on unsaturated heterocyclic monomers is disclosed in U.S. Pat. No. 6,469,097 to Bett et al. Bett et al. disclose aqueous dispersions of water-insoluble polymers obtained from the polymerization of a mixture of monomers comprising: (1) at least one unsaturated heterocyclic monomer (A): (i) comprising at least one nucleophilic hetero atom, containing at least one exocyclic ethylenic unsaturation, and (ii) containing at least one exocyclic ethylenic unsaturation, and (iii) whose heterocycle comprises at least one ethylenic unsaturation; and (2) optionally at least one ethylenically unsaturated functionalized monomer (B) and/or an aromatic monomer containing at least one exocyclic ethylenic unsaturation.

For environmental, health and safety reasons it is desirable to minimize the concentration of residual monomer present in a product latex polymer. Accordingly, there remains a need for latex copolymers having >5 wt % of units derived from a monomer containing an unsaturated heterocycle, wherein the residual heterocyclic containing monomer content in the latex copolymer is minimized (i.e., ≦1,000 ppm)

In one aspect of the present invention, there is provided a composition comprising: a latex copolymer comprising polymerized units of a monomer X and a monomer Y; wherein the latex copolymer comprises >5 wt % of monomer X derived units; wherein the latex copolymer comprises ≦1,000 ppm of residual monomer X; wherein monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof; and wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof.

In another aspect of the present invention, there is provided a method for making a latex copolymer comprising: providing an aqueous solvent; providing a monomer X; providing a monomer Y; providing a polymerization initiator selected from 2,2'-Azobis(4-methoxy-2,4-dimethylvaleronitrile); 2,2'-Azobis(2,4-dimethyl-valeronitrile);
2,2'-Azobisisobutyronitrile; 2,2'-Azobis(2-methyl-butyronitrile);
1,1'-Azobis(1-cyclo-hexanecarbonitrile); 2,2'-Azobis(2,4,4-trimethylpentane);
2,2'-Azobis(N,N'-dimethyleneisobutyramidine)dihydrochloride;
2,2'-Azobis(2-amidinopropane)dihydrochloride; 4,4'-Azobis(4-cyanovaleriic acid) and combinations thereof; combining the monomer X, the monomer Y, the polymerization initiator and the aqueous solvent forming a reaction mixture; maintaining the pH of the reaction mixture at ≧7; wherein the latex copolymer comprises >5 wt % of monomer X derived units; wherein monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof; and, wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof.

In another aspect of the present invention, there is provided a pressure sensitive adhesive composition comprising a latex copolymer of the present invention.

The term "copolymer" as used herein and in the appended claims refers to polymers polymerized from at least two different monomers.

The term "aqueous" as used herein and in the appended claims means water and mixtures composed substantially of water and water miscible solvents.

The use of the term "(meth)" followed by another term such as acrylic, acrylate, acrylamide, etc., as used herein and in the appended claims, refers to, for example, both acrylic and methacrylic; acrylate and methacrylate; acrylamide and methacrylamide; etc.

The glass transition temperature ("Tg") for the copolymers and pressure sensitive adhesive formulations of the present invention may be measured by differential scanning calorimetry (DSC) taking the mid-point in the heat flow versus temperature transition as the Tg value.

The term "residual monomer X" as used herein and in the appended claims means unpolymerized monomer based on the total latex. The residual monomer concentration is determined using well known gas chromatography methods.

In some embodiments of the present invention, the latex copolymer comprises >5 wt % of monomer X derived units. In some aspects of these embodiments, the latex copolymer comprises ≧10 wt % of monomer X derived units. In some aspects of these embodiments, the latex copolymer comprises ≧15 wt % of monomer X derived units. In some aspects of these embodiments, the latex copolymer comprises ≧20 wt % of monomer X derived units. In some aspects of these embodiments, the latex copolymer comprises ≧25 wt % of monomer X derived units. In some aspects of these embodiments, the latex copolymer comprises ≧27 wt % of monomer X derived units. In some aspects of these embodiments, the latex copolymer comprises ≧28 wt % of monomer X derived units. In some aspects of these embodiments, the latex copolymer comprises ≧29 wt % of monomer X derived units. In some aspects of these embodiments, the latex copolymer comprises ≧30 wt % of monomer X derived units.

In some embodiments of the present invention, the latex copolymer comprises ≦1,000 ppm of residual monomer X. In some aspects of these embodiments, the latex copolymer comprises ≦900 ppm of residual monomer X. In some aspects of these embodiments, the latex copolymer comprises ≦800 ppm of residual monomer X. In some aspects of these embodiments, the latex copolymer comprises ≦700 ppm of residual monomer X. In some aspects of these embodiments, the latex copolymer comprises ≦600 ppm of residual monomer X. In some aspects of these embodiments, the latex copolymer comprises ≦500 ppm of residual monomer X. In some aspects of these embodiments, the latex copolymer comprises ≦400 ppm of residual monomer X.

In some embodiments of the present invention, monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof. In some aspects of these embodiments, monomer X is selected from vinyl imidazole, vinyl pyridine, derivatives thereof and combinations thereof. In some aspects of these embodiments, monomer X is selected from N-vinylimidazole, 2-vinylpyridine, 4-vinylpyridine and combinations thereof. In some aspects of these embodiments, monomer X is N-vinylimidazole.

In some embodiments of the present invention, monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof. In some aspects of these embodiments, monomer Y is selected from carboxylic acids, carboxylic acid esters, (meth)acrylamides, $C_8$-$C_{20}$ aromatic monomers containing at least one exocyclic ethylenic unsaturation and combinations thereof. In some aspects of these embodiments, monomer Y is selected from acrylic acid, methacrylic acid, itaconic acid, maleic acid, fumaric acid, methyl(meth)acrylate, ethyl(meth)acrylate, propyl(meth)acrylate, isopropyl acrylate, n-butyl(meth)acrylate, isobutyl(meth)acrylate, 2-ethylhexyl(meth)acrylate, decyl(meth)acrylate, lauryl(meth)acrylate, stearyl(meth)acrylate, styrene, vinyltoluene, α-methylstyrene and combinations thereof. In some aspects of these embodiments, monomer Y is n-butyl(meth)acrylate.

In some embodiments of the present invention, there is provided a composition comprising: a latex copolymer comprising polymerized units of a monomer X and a monomer Y; wherein the latex copolymer comprises >5 wt % of monomer X derived units; wherein the latex copolymer comprises $\leq$1,000 ppm of residual monomer X; wherein monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof; and wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof; and with the proviso that the composition comprises $\leq$5 wt % of units derived from ethylenically unsaturated monomer containing an epoxide function. In some aspects of these embodiments, the latex copolymer comprises $\leq$1 wt % of units derived from ethylenically unsaturated monomer containing an epoxide function. In some aspects of these embodiments, the latex copolymer comprises $\leq$0.5 wt % of units derived from ethylenically unsaturated monomer containing an epoxide function. In some aspects of these embodiments, the latex copolymer comprises $\leq$0.1 wt % of units derived from ethylenically unsaturated monomer containing an epoxide function. In some aspects of these embodiments, the latex copolymer comprises $\leq$0.05 wt % of units derived from ethylenically unsaturated monomer containing an epoxide function.

In some embodiments of the present invention, there is provided a composition comprising a latex copolymer of the present invention, wherein the composition has a pH $\geq$7. In some aspects of these embodiments, the composition has a pH of 7-10. In some aspects of these embodiments, the composition has a pH of $\geq$8. In some aspects of these embodiments, the composition has a pH of 8-10. In some aspects of these embodiments, the composition has a pH of $\geq$9. In some aspects of these embodiments, the composition has a pH of 9-10.

In some embodiments of the present invention, there is provided a composition comprising a latex copolymer of the present invention, wherein the composition comprises $\geq$20 wt % solids. In some aspects of these embodiments, the composition comprises $\geq$25 wt % solids. In some aspects of these embodiments, the composition comprises $\geq$30 wt % solids.

In some embodiments of the present invention, there is provided a composition comprising >5 to 50 wt % of polymerized units derived from monomer X and 95 to 50 wt % of polymerized units derived from monomer Y. In some aspects of these embodiments, there is provided a composition comprising >5 to 30 wt % of polymerized units derived from monomer X and 95 to 70 wt % of polymerized units derived from monomer Y.

In some embodiments of the present invention, the composition of the present invention further comprises polymerized units derived from a crosslinker. Crosslinker suitable for use with the present invention include multi-ethylenically unsaturated monomers. In some aspects of these embodiments, the crosslinker derived units are derived from crosslinker selected from 1,4-butanediol diacrylate; 1,4-butanediol dimethacrylate; 1,6-hexanediol diacrylate; 1,1,1-trimethylol propane triacrylate; 1,1,1-trimethylol propane trimethacrylate; allyl methacrylate; divinylbenzene; and N-allyl acrylamide. In some aspects of these embodiments, the crosslinker derived units are derived from crosslinker selected from 1,1,1-trimethylol propane trimethacrylate. In some aspects of these embodiments, the composition comprises 0.01 to 10 wt % (based on solids) crosslinker. In some aspects of these embodiments, the composition comprises 0.01 to 5 wt % (based on solids) crosslinker. In some aspects of these embodiments, the composition comprises 0.01 to 1 wt % (based on solids) crosslinker.

In some embodiments of the present invention, the composition of the present invention further comprises a polymerization initiator and/or the degradation products of a polymerization initiator. In some aspects of these embodiments, the polymerization initiator is selected from 2,2'-Azobis(4-methoxy-2,4-dimethylvaleronitrile);

2,2'-Azobis(2,4-dimethyl-valeronitrile); 2,2'-Azobisisobutyronitrile;

2,2'-Azobis(2-methyl-butyronitrile); 1,1'-Azobis(1-cyclohexanecarbonitrile);

2,2'-Azobis(2,4,4-trimethylpentane);

2,2'-Azobis(N,N'-dimethyleneisobutyramidine)dihydrochloride;

2,2'-Azobis(2-amidinopropane) dihydrochloride; 4,4'-Azobis(4-cyanovaleriic acid) and combinations thereof. In some aspects of these embodiments, the polymerization initiator is selected from 4,4'-azobis(4-cyanovaleric acid) which is commercially available from DuPont under the name VAZOO® 68.

In some embodiments of the present invention, the composition further comprises a chain transfer agent and/or the degradation products of a chain transfer agent. In some aspects of these embodiments, the chain transfer agent is selected from any conventional chain transfer agent that is compatible with the composition. In some aspects of these embodiments, the chain transfer agent is selected from t-dodecyl mercaptan, n-dodecyl mercaptan, hexanethiol, methyl mercaptopropionate and combinations thereof.

In some embodiments of the present invention, the composition of the present invention further comprises a surfactant and/or the degradation products of a surfactant. In some aspects of these embodiments, the surfactant may be any conventional surfactant that is compatible with the composition. In some aspects of these embodiments, the surfactant is selected from sodium lauryl sulfate, sodium laurylbenzenesulfonate, sodium dioctylsulfosuccinate, sodium polyoxyethylene lauryl ether sulfate and combinations thereof.

In some embodiments of the present invention, there is provided a pressure sensitive adhesive formulation. In some aspects of these embodiments, the pressure sensitive adhesive formulation comprises a base material. In some aspects of these embodiments, the base material comprises at least one polymerized ethylenically unsaturated monomer. In some aspects of these embodiments, the ethylenically unsaturated monomer is selected from (meth)acrylic ester monomers, including for example methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalky(meth)acrylates; styrene; substituted styrene; butadiene; vinyl acetate; vinyl esters; vinyl monomers, including for example vinyl chloride, vinylidiene chloride, N-vinyl pyrollidone; (meth)acrylonitrile; and combinations thereof. In some aspects of these embodiments, the ethylenically unsaturated monomer is selected from (meth)acrylic ester monomers and combinations thereof. In some aspects of these embodiments, the ethylenically unsaturated monomer is selected from methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalky(meth)acrylates, and combinations thereof. In some aspects of these embodiments, the ethylenically unsaturated monomer is selected from methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and combinations thereof.

In some embodiments of the present invention, the pressure sensitive adhesive formulation optionally further comprises 0 to 10 wt % (based on solids) of polymerized units derived from monoethylenically-unsaturated carboxylic acid monomers. In some aspects of these embodiment, the monoethylenically unsaturated carboxylic acid monomers are selected from (meth)acrylic acid, crotonic acid, itaconic acid, fumaric acid, maleic acid, monomethyl itaconate, monomethyl fumarate, monobutyl fumarate, maleic anhydride and combinations thereof. In some aspects of these embodiments, the pressure sensitive adhesive formulation comprises 0.2 to 5 wt % (based on solids) of polymerized units derived from acrylic acid, methacrylic acid, itaconic acid and combinations thereof.

In some embodiments of the present invention, the pressure sensitive adhesive formulation optionally further comprises 0 to 1 wt % (based on solids) of polymerized units derived from multi-ethylenically unsaturated monomers. In some aspects of these embodiments, the pressure sensitive adhesive formulation comprises 0 to 0.1 wt % (based on solids) of polymerized units derived from multi-ethylenically unsaturated monomers. In some aspects of these embodiments, the multi-ethylenically unsaturated monomers are selected from allyl methacrylate; dially phothalate; 1,4-butylene glycol dimethacrylate; 1,2-ethylene glycol dimethacrylate, 1,6-hexanediol diacrylate; divinyl benzene and combinations thereof.

In some embodiments of the present invention, the pressure sensitive adhesive formulation has a Tg of $\leq 20°$ C. In some aspects of these embodiments, the pressure sensitive adhesive formulation has a Tg of $-80$ to $20°$ C., alternatively $-80$ to $0°$ C., alternatively $-80$ to $-10°$ C.; alternatively $-60$ to $-20°$ C.; alternatively $-50$ to $-30°$ C.

In some embodiments of the present invention, the pressure sensitive adhesive formulation optionally further comprises a conventional adjuvant. In some aspects of these embodiment, the pressure sensitive adhesive formulation comprises a conventional adjuvant selected from tackifiers, pigments, emulsifiers, coalescing agents, buffers, neutralizers, thickeners or rheology modifiers, humectants, wetting agents, biocides, plasticizers, antifoaming agents, colorants, waxes, antioxidants, heat stabilizers, photoinitiators, depolymerizers, fillers, reinforcing agents, crosslinkers, chain transfer agents, catalysts, and combinations thereof.

In some embodiments of the present invention, the pressure sensitive adhesive formulation may be applied to a substrate such as, for example, tape or label stock, for example, paper or polymer film such as polypropylene, polyvinyl chloride, polyethylene terephthalate, metal, with or without a prior substrate treatment such as an acid etch or corona discharge or primer using conventional adhesives application methods such as, for example, roll coating, doctor-blade application, and printing methods.

In some embodiments of the present invention, the pressure sensitive adhesive formulation has a pH $\geq 6.0$. In some aspects of these embodiments, the pressure sensitive adhesive formulation has a pH $\geq 7.0$, alternatively $\geq 8.0$; alternatively $\geq 9.0$.

In some embodiments of the present invention, there is provided a method for making a latex copolymer comprising: providing an aqueous solvent; providing a monomer X; providing a monomer Y; providing a polymerization initiator selected from 2,2'-Azobis(4-methoxy-2,4-dimethylvaleronitrile); 2,2'-Azobis(2,4-dimethyl-valeronitrile);
2,2'-Azobisisobutyronitrile; 2,2'-Azobis(2-methyl-butyronitrile);
1,1'-Azobis(1-cyclo-hexanecarbonitrile); 2,2'-Azobis(2,4,4-trimethylpentane);
2,2'-Azobis(N,N'-dimethyleneisobutyramidine)dihydrochloride;
2,2'-Azobis(2-amidinopropane) dihydrochloride; 4,4'-Azobis(4-cyanovaleriic acid) and combinations thereof; combining the monomer X, the monomer Y, the polymerization initiator and the aqueous solvent forming a reaction mixture; maintaining the pH of the reaction mixture at $\geq 7$; wherein the latex copolymer comprises >5 wt % of monomer X derived units; wherein monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof; wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof. In some aspects of these embodiments, the polymerization initiator is 4,4'-azobis(4-cyanovaleric acid)). In some aspects of these embodiments, the pH of the reaction mixture is maintained at 7-10, alternatively at $\geq 8$, alternatively at 8-10, alternatively at ≧9, alternatively at 9-10. In some aspects of these embodiments, the latex copolymer comprises ≧10 wt %, alternatively ≧15 wt %, alternatively ≧20 wt %, alternatively ≧25 wt %, alternatively ≧27 wt %, alternatively ≧28 wt %, alternatively ≧29 wt %, alternatively ≧30 wt % of monomer X derived units. In some aspects of these embodiments, monomer X is selected from vinyl imidazole, vinyl pyridine, derivatives thereof and combinations thereof; alternatively monomer X is selected from N-vinylimidazole, 2-vinylpyridine, 4-vinylpyridine and combinations thereof. In some aspects of these embodiments, monomer X is N-vinylimidazole. In some aspects of these embodiments, monomer Y is selected from carboxylic acids, carboxylic acid esters, (meth)acrylamides, $C_8$-$C_{20}$ aromatic monomers containing at least one exocyclic ethylenic unsaturation and combinations thereof. In some aspects of these embodiments, monomer Y is selected from acrylic acid, methacrylic acid, itaconic acid, maleic acid, fumaric acid, methyl(meth)acrylate, ethyl(meth)acrylate, propyl(meth)acrylate, isopropyl acrylate, n-butyl(meth)acrylate, isobutyl(meth)acrylate, 2-ethylhexyl(meth)acrylate, decyl(meth)acrylate, lauryl(meth)acrylate, stearyl(meth)acrylate, styrene, vinyltoluene, α-methylstyrene and combinations thereof. In some aspects of these embodiments, monomer Y is n-butyl(meth)acrylate.

In some embodiments of the present invention, there is provided a method for making a latex copolymer comprising: providing an aqueous solvent; providing a monomer X; providing a monomer Y; providing a polymerization initiator selected from
2,2'-Azobis(4-methoxy-2,4-dimethylvaleronitrile); 2,2'-Azobis(2,4-dimethyl-valeronitrile);
2,2'-Azobisisobutyronitrile; 2,2'-Azobis(2-methyl-butyronitrile);
1,1'-Azobis(1-cyclo-hexanecarbonitrile); 2,2'-Azobis(2,4,4-trimethylpentane);
2,2'-Azobis(N,N'-dimethyleneisobutyramidine)dihydrochloride;
2,2'-Azobis(2-amidinopropane) dihydrochloride; 4,4'-Azobis(4-cyanovaleriic acid) and combinations thereof, combining the monomer X, the monomer Y, the polymerization initiator and the aqueous solvent forming a reaction mixture; maintaining the pH of the reaction mixture at ≧7; wherein the latex copolymer comprises ≧5 wt % of monomer X derived units; wherein the latex copolymer comprises ≦1,000 ppm of residual monomer X; wherein monomer X is selected from vinyl imidazole, vinyl imidazoline, vinyl amidine, vinyl pyridine, vinyl pyrrole, vinyl pyrrilidone, vinyl caprolactam, derivatives thereof and combinations thereof; wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof; with the proviso that the latex copolymer comprises ≦5 wt % of units derived from ethylenically unsaturated monomer containing an epoxide function. In some aspects of these embodiments, the polymerization initiator is 4,4'-azobis(4-cyanovaleric acid)). In some aspects of these embodiments, the pH of the reaction mixture is maintained at 7-10, alternatively at ≧8, alternatively at 8-10, alternatively at ≧9, alternatively at 9-10. In some aspects of these embodiments, the latex copolymer comprises ≧10 wt %, alternatively ≧15 wt %, alternatively ≧20 wt %, alternatively ≧25 wt %, alternatively ≧27 wt %, alternatively ≧28 wt %, alternatively ≧29 wt %, alternatively ≧30 wt % of monomer X derived units. In some aspects of these embodiments, the latex copolymer comprises ≦900 ppm, alternatively ≦800 ppm, alternatively ≦700 ppm, alternatively ≦600 ppm, alternatively ≦500 ppm, alternatively ≦400 ppm of residual monomer X. In some aspects of these embodiments, monomer X is selected from vinyl imidazole, vinyl pyridine, derivatives thereof and combinations thereof, alternatively monomer X is selected from N-vinylimidazole, 2-vinylpyridine, 4-vinylpyridine and combinations thereof. In some aspects of these embodiments, monomer X is N-vinylimidazole. In some aspects of these embodiments, monomer Y is selected from carboxylic acids, carboxylic acid esters, (meth)acrylamides, $C_8$-$C_{20}$ aromatic monomers containing at least one exocyclic ethylenic unsaturation and combinations thereof. In some aspects of these embodiments, monomer Y is selected from acrylic acid, methacrylic acid, itaconic acid, maleic acid, fumaric acid, methyl(meth)acrylate, ethyl(meth)acrylate, propyl(meth)acrylate, isopropyl acrylate, n-butyl(meth)acrylate, isobutyl(meth)acrylate, 2-ethylhexyl(meth)acrylate, decyl(meth)acrylate, lauryl(meth)acrylate, stearyl(meth)acrylate, styrene, vinyltoluene, α-methylstyrene and combinations thereof. In some aspects of these embodiments, monomer Y is n-butyl(meth)acrylate. In some aspects of these embodiments, the latex copolymer comprises ≦1 wt %, alternatively ≦0.5 wt %, alternatively ≦0.1 wt %, alternatively ≦0.05 wt % of units derived from ethylenically unsaturated monomer containing an epoxide function.

In some embodiments of the present invention, the method of making a latex copolymer further comprises adding a chain transfer agent to the reaction mixture.

In some embodiments of the present invention, there is provided a pressure sensitive adhesive formulation comprising a latex copolymer of the present invention. In some aspects of these embodiments, the pressure sensitive adhesive formulation comprises 0.01 to 20 wt %, alternatively 0.1 to 15 wt %, alternatively 0.1 to 12 wt %, alternatively 0.3 to 10 wt %, alternatively 0.5 to 8 wt %, alternatively 1 to 6 wt % of a latex copolymer of the present invention. Addition of a latex copolymer of the present invention to a pressure sensitive adhesive formulation provides at least one enhanced property of the pressure sensitive adhesive formulation. Properties of the pressure sensitive adhesive formulation that may be enhanced by addition of a latex copolymer of the present invention include, for example, stainless steel shear, tack, plasticizer migration resistance for vinyl facestocks, water whitening and humidity resistance.

Some embodiments of the present invention will now be described in detail in the following Examples. All fractions and percentages set forth below in the Examples are by weight unless otherwise specified. The following abbreviations are used in the Examples:

BA—butyl acrylate
BOM—based on monomer
DI—deionized
DSC—differential scanning calorimetry
EA—ethyl acrylate
GC—gas chromatography
GPC—gel permeation chromatography
nDDM—n-dodecyl mercaptan
NN-MBA—N,N-methylene bisacrylamide
SLS—sodium lauryl sulfate
Tg—glass transition temperature
TMPTA—trimethylolpropane triacrylate VAZO® 68 free radical initiator—4,4'-azobis(4-cyanovaleric acid) available from DuPont
VI—1-vinyl imidazole

EXAMPLES 1-8

Synthesis of a Latex Copolymer (w/Seed)

DI water (183.86 g) and a 32.6%, 58 nm seed latex (23.02 g) were charged to a 1,000 mL reactor flask equipped with a mechanical stirrer, thermometer, temperature controlled, heating mantel, condenser and nitrogen sweep. The contents of the reactor flask were heated to 85° C.

In a separate container, BA (105.0 g), n-DDM (amount indicated in Table 1), DI water (94.29 g) and 28% SLS (10.71 g) were combined. The contents of this container were then emulsified in a high speed rotor stator mixer to form a monomer emulsion.

In another container, VI (45 g), VAZO® 68 free radical initiator (2.25 g), DI water (54.0 g), and 1N NaOH solution (17.76 g) were combined to form an aqueous feed solution.

The monomer emulsion and the aqueous feed solution were then fed separately to the reactor flask while maintaining the temperature of the reactor flask contents at 85° C. The feeds of the monomer emulsion and aqueous feed solution to the reactor flask were started simultaneously. The monomer emulsion fed then continued for 45 minutes while the aqueous feed solution feed continued for 90 minutes. Following the end of the aqueous feed solution feed, the contents of the reactor flask were held at 85° C. for an additional 2.5 hours for a total reaction time of 4 hours giving a product latex copolymer.

The solids content, as determined by gravimetry; the residual monomer content, as determined by GC; the particle size, as determined by light scattering particle size analysis; and the molecular weight, as determined by GPC, of the latex copolymers are reported in Table 1. The Tg of the dried copolymer, as determined by DSC, is also reported in Table 1.

In another container, VAZO® 68 free radical initiator (1.50 g), DI water (73.5 g) and 1N NaOH (10.70 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 30 minutes while the aqueous. initiator solution feed continued for 60 minutes. Following the end of the aqueous initiator solution feed, the contents of the reactor flask were held at 85° C. for an additional 2.0 hours for a total reaction time of 3.0 hours giving a product latex copolymer.

The solids content, as determined by gravimetry; the residual monomer content, as determined by GC; and the particle size, as determined by light scattering particle size analysis of the latex copolymer are reported in Table 2. The Tg of the dried copolymer, as determined by DSC, is also reported in Table 2.

TABLE 2

| Ex. | BA (g) | VI (g) | TMPTA (g) | Solids (wt %) | Residual Monomer BA (ppm) | Residual Monomer VI (ppm) | Particle size (nm) | Tg (° C.) |
|---|---|---|---|---|---|---|---|---|
| 9  | 112.5 | 37.5 | 0.0  | 24.54 | 917 | 867 | 71  | −5 |
| 10 | 97.5  | 37.5 | 15.0 | 31.10 | 440 | 600 | 98  | 27 |
| 11 | 97.5  | 37.5 | 15.0 | 30.60 | 292 | 504 | 174 | 23 |
| 12 | 90.0  | 45.0 | 15.0 | 28.50 | 509 | 545 | 302 | 45 |

TABLE 1

| Ex. | n-DDM (g) | Solids (wt %) | Residual Monomer BA (ppm) | Residual Monomer VI (ppm) | Particle size (nm) | Mw (g/mol) | Mn (g/mol) | Tg (° C.) |
|---|---|---|---|---|---|---|---|---|
| 1 | 0.0 | 30.64 | 339 | 540 | 171 | —      | —     | —   |
| 2 | 1.5 | 31.47 | 297 | 395 | 163 | 11,922 | 7,631 | 13  |
| 3 | 3.0 | 30.72 | 349 | 300 | 163 | 10,128 | 6,856 | 6   |
| 4 | 4.5 | 31.25 | 452 | 376 | 166 | 7,674  | 5,693 | −6  |
| 5 | 6.0 | 29.22 | 403 | 473 | 166 | 4,764  | 3,985 | −9  |
| 6 | 7.5 | 31.04 | 410 | 315 | 164 | 4,984  | 4,044 | −16 |
| 7 | 3.0 | 30.37 | 320 | 352 | 157 | —      | —     | —   |
| 8 | 1.5 | 30.05 | 552 | 474 | 159 | —      | —     | —   |

EXAMPLES 9-12

Synthesis of a Latex Copolymer (w/o Seed)

DI water (253.4 g) and 28% SLS (10.72 g) were charged to a 1,000 mL round bottomed reactor flask equipped with a mechanical stirrer, thermometer, temperature controller, heating mantel, condenser and nitrogen sweep. The contents of the reactor flask were heated with agitation to 85° C.

In a separate container, BA (amount indicated in Table 2), VI (amount indicated in Table 2) and TMPTA (amount indicated in Table 2) were combined to form a monomer mix.

EXAMPLE 13-19

Synthesis of a Latex Copolymer (w/Seed)

DI water (255.42 g), 28% SLS (10.72 g) and a 32.6%, 58 nm seed latex (58.93 g) were charged to a 1,000 mL reactor flask equipped with a mechanical stirrer, thermometer, temperature controlled, heating mantel, condenser and nitrogen sweep. The contents of the reactor flask were heated to 85° C.

In a separate container, BA (amount indicated in Table 3), VI (amount indicated in Table 3) and TMPTA (amount indicated in Table 3) were combined to form a monomer mix.

In another container, VAZO® 68 free radical initiator (1.50 g), DI water (73.5 g) and 1N NaOH (11.77 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 30 minutes while the aqueous initiator solution feed continued for 60 minutes. Following the end of the aqueous initiator solution feed, the contents of the reactor flask were held at 85° C. for an additional 2.0 hours for a total reaction time of 3.0 hours giving a product latex copolymer.

The solids content, as determined by gravimetry; the residual monomer content, as determined by GC; and, the particle size, as determined by light scattering particle size analysis of the latex copolymer are reported in Table 3. The Tg of the dried copolymer, as determined by DSC, is also reported in Table 3.

TABLE 3

| Ex. | BA (g) | VI (g) | TMPTA (g) | Solids (wt %) | Residual Monomer BA (ppm) | Residual Monomer VI (ppm) | Particle size (nm) | Tg (° C.) |
|---|---|---|---|---|---|---|---|---|
| 13 | 120 | 15 | 15 | 30.28 | 552 | 26 | 117 | −20 |
| 14 | 105 | 30 | 15 | 30.95 | 652 | 330 | 116 | −14 |
| 15 | 90 | 45 | 15 | 31.18 | 641 | 298 | 119 | 45 |
| 16 | 105 | 45 | 0 | 30.95 | 878 | 280 | 122 | 16 |
| 17 | 60 | 45 | 45 | 30.67 | 118 | 300 | 163 | 102 |
| 18 | 105 | 22.5 | 22.5 | 30.88 | 260 | 391 | 117 | 15 |
| 19 | 105.0 | 22.5 | 22.5 | 31.03 | 247 | 355 | 116 | 12 |

EXAMPLES 20-22

Synthesis of a Latex Copolymer

DI water (379.63 g) and 28% SLS (16.07 g) were charged to a 1,000 mL round bottomed reactor flask equipped with a mechanical stirrer, thermometer, temperature controller, heating mantel, condenser and nitrogen sweep. The contents of the reactor flask were heated with agitation to 85° C.

In a separate container, EA (157.5 g), VI (67.5) and NN-MBA (amount indicated in Table 4) were combined to form a monomer mix.

In another container, VAZO® 68 free radical initiator (2.25 g), DI water (110.25 g) and 1N NaOH (17.66 g) were combined to form an aqueous initiator solution.

The monomer mix and the aqueous initiator solution were then fed separately to the reactor flask while maintaining the temperature of the reactor flask contents at 85° C. The feeds of the monomer mix and aqueous initiator solution to the reactor flask were started simultaneously. The monomer mix feed then continued for 60 minutes while the aqueous initiator solution feed continued for 120 minutes. Following the end of the aqueous initiator solution feed, the contents of the reactor flask were held at 85° C. for an additional hour for a total reaction time of 3.0 hours giving a product latex copolymer.

The solids content, as determined by gravimetry; the residual monomer content, as determined by GC; and the particle size, as determined by light scattering particle size analysis of the latex copolymer are reported in Table 4.

TABLE 4

| Ex. | NN-MBA (g) | Solids (wt %) | Residual Monomer EA (ppm) | Residual Monomer VI (ppm) | Particle size (nm) |
|---|---|---|---|---|---|
| 20 | 0.45 | 30.5 | 1435 | 1043 | 242 |
| 21 | 0.45 | 30.0 | 713 | 542 | 222 |
| 22 | 1.13 | 20.6 | 673 | 219 | 242 |

EXAMPLE 23

Preparation of Modified Pressure Sensitive Adhesive Composition

A modified pressure sensitive adhesive composition was prepared using an aqueous, acrylic based pressure sensitive adhesive material commercially available from Rohm and Haas Company under the name Robond PS-90 as the base component. To this base component was blended 3 wt % of the latex copolymer prepared according to Example 7 to provide the product modified pressure sensitive adhesive composition.

EXAMPLES 24-25

Testing in Accordance with PTSC-7 Method

The product modified pressure sensitive adhesive composition from Example 23 and the base component (Robond PS-90) were tested for Stainless Steel Shear (holding power) with a 4 pound load in accordance with Pressure Sensitive Tape Council method PTSC-7. The pressure sensitive adhesive compositions were directly coated onto 2 mil polyester test fabrics (1"×1") and dried for 5 minutes at 105°C. The results of the tests are provided in Table 5.

TABLE 5

| Ex. | Pressure Sensitive Adhesive | (hrs) |
|---|---|---|
| 24 | Robond PS-90 (control) | 15 |
| 25 | Product from Ex. 23 | 168 |

We claim:
1. A composition comprising:
a latex copolymer comprising polymerized units of a monomer X and a monomer Y; and,
a polymerization initiator or the degradation products of the polymerization initiator;
wherein the latex copolymer comprises >5 wt % of monomer X derived units;
wherein the latex copolymer comprises <1,000 ppm residual monomer X;
wherein monomer X is vinyl imidazole;
wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof;
wherein the polymerization initiator is selected from 2,2'-Azobis(4-methoxy-2,4-dimethylvaleronitrile); 2,2'-Azobis(2,4-dimethyl-valeronitrile);

2,2'-Azobisisobutyronitrile; 2,2'-Azobis(2-methyl-butyronitrile);
1,1'-Azobis(1-cyclo-hexanecarbonitrile); 2,2'-Azobis(2,4,4-trimethylpentane);
2,2'-Azobis(N,N'-dimethyleneisobutyramidine)dihydrochloride; 2,2'-Azobis(2-amidinopropane) dihydrochloride; 4,4'-Azobis(4-cyanovaleriic acid) and combinations thereof;

wherein the composition comprises greater than or equal to 25 wt % solids; and, wherein the composition has a pH of greater than or equal to 7.

2. The composition of claim 1, wherein the latex copolymer comprises >5 to 50 wt % of units derived from monomer X and 95 to 50 wt % of units derived from monomer Y.

3. The composition of claim 1, wherein the composition further comprises a crosslinker selected from 1,4-butanediol diacrylate; 1,4-butanediol dimethacrylate;

1,6-hexanediol diacrylate; 1,1,1-trimethylol propane triacrylate; 1,1,1-trimethylol propane trimethacrylate; allyl methacrylate; divinylbenzene and N-allyl acrylamide.

4. The composition of claim 1, wherein the composition further comprises a chain transfer agent or the degradation products of the chain transfer agent; wherein the chain transfer agent is selected from t-dodecyl mercaptan, n-dodecyl mercaptan, hexanethiol, methyl mercaptopropionate and combinations thereof 5. The composition of claim 1, wherein the composition further comprises a surfactant or the degradation products of the surfactant; wherein the surfactant is selected from sodium lauryl sulfate, sodium laurylbenzenesulfonate, sodium dioctylsulfosuccinate, sodium polyoxyethylene lauryl ether sulfate and combinations thereof.

6. The composition of claim 1, further comprising a base material comprising at least one polymerized ethylenically unsaturated monomer selected from methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, aminoalky (meth) acrylates, and combinations thereof; wherein the composition has a Tg of −80 to −20° C. and wherein the composition is suitable for use when dry as a pressure sensitive adhesive.

7. A method for making a latex copolymer comprising:
providing an aqueous solvent;
providing a monomer X;
providing a monomer Y;
providing a polymerization initiator selected from
2,2'-Azobis(4-methoxy-2,4-dimethylvaleronitrile); 2,2'-Azobis(2,4-dimethyl-valeronitrile);
2,2'-Azobisisobutyronitrile; 2,2'-Azobis(2-methyl-butyronitrile);
1,1'-Azobis(1-cyclo-hexanecarbonitrile); 2,2'-Azobis(2,4,4-trimethylpentane);
2,2'-Azobis(N,N'-dimethyleneisobutyramidine)dihydrochloride; 2,2'-Azobis(2-amidinopropane) dihydrochloride; 4,4'-Azobis(4-cyanovaleriic acid) and combinations thereof;
combining the monomer X, the monomer Y, the polymerization initiator and the aqueous solvent forming a reaction mixture;
maintaining the pH of the reaction mixture at >7;
wherein the latex copolymer comprises >5 wt % of monomer X derived units;
wherein the copolymer comprises <1000 ppm residual monomer X;
wherein monomer X is vinyl imidazole; and,
wherein monomer Y is selected from carboxylic acids, carboxylic acid salts, carboxylic acid esters, organosulphuric acids, organosulphuric acid salts, sulphonic acids, sulphonic acid salts, phosphonic acids, phosphonic acid salts, vinyl esters, (meth)acrylamides, $C_8$-$C_{20}$ aromatic monomers containing at least one exocyclic ethylenic unsaturation and combinations thereof.

* * * * *